United States Patent
Atias et al.

(10) Patent No.: US 9,469,720 B2
(45) Date of Patent: Oct. 18, 2016

(54) EPDXY RESIN PRODUCTION

(71) Applicant: Blue Cube IP LLC, Midland, MI (US)

(72) Inventors: Jesus A. Atias, Cazlgary (CA); Philip J. Carlberg, Loveland, OH (US); Ravindra S. Dixit, Lake Jackson, TX (US); Robert M. Drake, Richwood, TX (US); Dan Tirtowidjojo, Lake Jackson, TX (US); David H. West, Bellaire, TX (US); William G. Worley, Missouri City, TX (US); Thomas C. Young, Lake Jackson, TX (US)

(73) Assignee: BLUE CUBE IP LLC, Midland, MI (US)

( * ) Notice: Subject to any disclaimer, the term of this patent is extended or adjusted under 35 U.S.C. 154(b) by 100 days.

(21) Appl. No.: 14/365,753

(22) PCT Filed: Dec. 6, 2012

(86) PCT No.: PCT/US2012/068075
§ 371 (c)(1),
(2) Date: Jun. 16, 2014

(87) PCT Pub. No.: WO2013/095936
PCT Pub. Date: Jun. 27, 2013

(65) Prior Publication Data
US 2014/0336348 A1    Nov. 13, 2014

Related U.S. Application Data

(60) Provisional application No. 61/577,352, filed on Dec. 19, 2011.

(51) Int. Cl.
C08G 59/06 (2006.01)
C08G 59/08 (2006.01)

(52) U.S. Cl.
CPC ............. *C08G 59/063* (2013.01); *C08G 59/08* (2013.01)

(58) Field of Classification Search
None
See application file for complete search history.

(56) References Cited

U.S. PATENT DOCUMENTS

| 2,096,552 | A | | 10/1937 | Krein |
| 2,848,435 | A | | 8/1958 | Griffin et al. |
| 2,986,551 | A | * | 5/1961 | Griffin et al. ....... C07D 303/24 528/106 |
| 2,986,552 | A | | 5/1961 | Landua et al. |
| 2,995,612 | A | | 8/1961 | Hervert |
| 3,221,032 | A | | 11/1965 | McWhorter |
| 3,296,157 | A | * | 1/1967 | Brojer et al. ........ C08G 59/063 525/95 |
| 3,637,579 | A | * | 1/1972 | Barie, Jr. et al. .... C09J 123/025 156/330 |
| 3,767,618 | A | * | 10/1973 | Hairston et al. ...... C08G 59/063 528/95 |
| 4,499,255 | A | | 2/1985 | Wang et al. |
| 4,582,892 | A | | 4/1986 | Chang et al. |
| 4,877,857 | A | | 10/1989 | Shirtum et al. |
| 5,098,993 | A | * | 3/1992 | Kawanami et al. ... C08G 65/30 526/88 |
| 5,245,057 | A | | 9/1993 | Shirtum |
| 5,393,518 | A | * | 2/1995 | Kwass ................... A61K 8/064 424/66 |
| 6,180,394 | B1 | | 1/2001 | Bisschops et al. |
| 2003/0073802 | A1 | | 4/2003 | Ogura et al. |

FOREIGN PATENT DOCUMENTS

| EP | 0155238 A2 | 9/1985 |
| GB | 2001991 A | 2/1979 |
| GB | 2095679 A | 10/1982 |
| WO | 2007031332 A1 | 3/2007 |

OTHER PUBLICATIONS

Derwent accession No. 1985-231898 for European Patent No. 155,238 A, Flaux et al., Sep. 18, 1985, two pages.*
PCT/US2012/068075, International Search Report and Written Opinion of the International Searching Authority mailed Mar. 1, 2013.
PCT/US2012/068075. International Preliminary Report on Patentability mailed Jul. 3, 2014.

* cited by examiner

*Primary Examiner* — Robert Sellers
(74) *Attorney, Agent, or Firm* — Polsinelli PC

(57) ABSTRACT

A process comprising: a) contacting a polyhydric phenol and an epihalohydrin in the presence of a catalyst under reaction conditions to form an organic feed comprising a bishalohydrin ether; b) contacting the organic feed and an aqueous feed comprising an inorganic hydroxide with a high shear mixer to produce a first mixed feed; c) contacting the first mixed feed with a phase separator to form a first organic product comprising an epoxy resin and a first aqueous product; and d) recovering the first organic product, is disclosed.

11 Claims, No Drawings

EPOXY RESIN PRODUCTION

REFERENCE TO RELATED APPLICATIONS

The present application claims the benefit of U.S. Provisional Application No. 61/577,352, filed on Dec. 19, 2011.

FIELD OF THE INVENTION

Embodiments disclosed herein relate generally to a process of producing epoxy resins by contacting a polyhydric phenol with an epihalohydrin to form a chlorohydrin intermediate, and subsequently contacting the chlorohydrin intermediate with an inorganic hydroxide.

BACKGROUND OF THE INVENTION

In the production of low molecular weight epoxy resins from polyhydric phenols and epihalohydrins, two reactions must be accomplished: 1) the etherification (coupling) reaction to make the bishalohydrin ether of the polyhydric phenol, and 2) the dehalohydrogenation (epoxidation) reaction of the bishalohydrin ether of the polyhydric phenol with an inorganic hydroxide to make the epoxy resin. Two approaches to this problem are used. In the first, the two reactions are accomplished simultaneously, typically by adding an aqueous inorganic hydroxide mixture (usually 20-50% sodium hydroxide) to an organic mixture containing the polyhydric phenol and the epihalohydrin. In the second approach, a catalyst is used to etherify (couple) the polyhydric phenol and the epihalohydrin to produce the bishalohydrin ether, and then the dehalohydrogenation (epoxidation) reaction is accomplished by adding an aqueous inorganic hydroxide mixture (usually 20-50% sodium hydroxide) to an organic mixture containing the bishalohydrin ether and an organic solvent, where the solvent may be excess epihalohydrin. In both approaches, the challenge is to accomplish these reactions rapidly with equipment that does not require a large capital investment, while also conducting the reactions in such a way that the product meets the desired product specification and raw materials are not lost due to side reactions.

Currently, the most common way to prepare epoxy resins from polyhydric phenols is to perform the two reactions simultaneously in batch reactors by addition of an aqueous inorganic hydroxide mixture (typically 20-50% sodium hydroxide) to a mixture of the polyhydric phenol in excess epihalohydrin. Water may be left in the reactor to form a two-phase mixture or removed by azeotropic distillation to precipitate the inorganic halide salt. In either case, the maximum size of the reactors is limited, so a large facility will contain multiple batch reactors, increasing the cost of the facility. If the water is not removed, epihalohydrin hydrolysis reactions can result in a significant loss of the epihalohydrin to byproducts. If the water is removed, then the solid salt must be handled by downstream equipment, increasing the cost of the plant. When the water is removed, the reaction is also sensitive to excess hydroxide addition, which causes the formation of insoluble polyglycidol-type polymer.

In designing a process to produce epoxy resins from polyhydric phenols and epihalohydrins, the challenge is to identify a reaction scheme which accomplishes the reactions quickly in reactor equipment which does not have high capital costs, to conduct the reaction in such a manner that very little of the epihalohydrin is lost to byproduct reactions and no insoluble polymers are formed, and so that the separations equipment required for the rest of the process also does not have a high capital cost.

SUMMARY OF THE INVENTION

In an embodiment of the invention, there is disclosed a process comprising, consisting of, or consisting essentially of: a) contacting a polyhydric phenol and an epihalohydrin in the presence of a catalyst under reaction conditions to form an organic feed comprising a bishalohydrin ether; b) contacting the organic feed and an aqueous feed comprising an inorganic hydroxide with a high shear mixer to produce a first mixed feed; c) contacting the first mixed feed with a phase separator to form a first organic product comprising an epoxy resin and a first aqueous product; and d) recovering the first organic product.

DETAILED DESCRIPTION OF THE INVENTION

In an embodiment of the invention, there is disclosed a process comprising, consisting of, or consisting essentially of: a) contacting a phenol and an epihalohydrin in the presence of a catalyst under reaction conditions to form an organic feed comprising a bishalohydrin ether; b) contacting the organic feed and an aqueous feed comprising an inorganic hydroxide with a high shear mixer to produce a first mixed feed; c) contacting the first mixed feed with a phase separator to form a first organic product comprising an epoxy resin and a first aqueous product; and d) recovering the first organic product.

In an embodiment, step a) comprises contacting a phenol and an epihalohydrin in the presence of a catalyst under reaction conditions to form an organic feed comprising a bishalohydrin ether.

In an embodiment, the phenol is a polyhydric phenol. Suitable phenols for use in the present invention include, but are not limited to bisphenol-A, bisphenol-F, phenol-formaldehyde novolacs, cresol-formaldehyde novolacs, bisphenol-A-formaldehyde novolacs, trisphenols, biphenols, diphenols, hydroquinone, resorcinol, catechol, polycyclopentadiene polyphenols and a variety of other materials.

Other examples of phenols useful in the present invention are described in U.S. Pat. No. 4,499,255.

In an embodiment, bisphenol-A is used.

Epihalohydrins suitable for use in the present invention include, but are not limited to epichlorohydrin, epibromohydrin, methylepichlorohydrin, or any other known epihalohydrin. In an embodiment, the epihalohydrin is epichlorohydrin. Any known etherification catalyst can be used in step a). The etherification catalyst may be an inorganic hydroxide. Preferably the inorganic hydroxide is an alkali metal hydroxide or an alkaline earth hydroxide. Examples include, but are not limited to sodium hydroxide, potassium hydroxide, and calcium hydroxide. In an embodiment, sodium hydroxide is used. Other anionic etherification catalysts useful in this invention include quaternary ammonium halide catalysts such as benzyl trimethyl ammonium chloride, benzyl triethyl ammonium chloride, tetraethyl ammonium chloride, tetramethyl ammonium chloride, tetraethanol ammonium chloride, tetraethanol ammonium hydroxide and the like. Other useful etherification catalysts include quaternary phosphonium compounds, sulfonium compounds and the like. Suitable quaternary phosphonium compounds include ethyl triphenyl phosphonium iodide, ethyl triphenyl phosphonium bicarbonate, benzyl triphenyl phosphonium chloride, tetrabutyl phosphonium chloride and the like. Suitable sulfonium catalysts include thiourea catalysts such as tetramethyl thiourea, N,N'-diphenyl thiourea and the like. Basic ion exchange resins, such as DOWEX™ MSA-1, available from The Dow Chemical Company, Midland, Mich., are also useful catalysts. Additional etherification catalysts are described in U.S. Pat. Nos. 4,624,975 and 5,245,057.

Reaction conditions for step a) can include a reaction temperature in the range of from about 10° C. to about 100° C. In an embodiment, the reaction temperature is in the range of from about 20° C. to about 80° C., and in yet another embodiment, the reaction temperature is in the range of from about 30° C. to about 60° C.

The etherification reaction is preferably conducted with an excess of the epihalohydrin, more preferably using from more than 1 mole to 20 moles of the epihalohydrin per mole-equivalent of phenolic hydroxyl (OH) moiety, and most preferably using between 2 moles and 10 moles of epihalohydrin per mole-equivalent of phenolic OH moiety.

If an inorganic hydroxide is used as the etherification catalyst, preferably only enough inorganic hydroxide is used in step a) to etherify a substantial majority of the phenolic OH groups. Preferably, the ratio of mole equivalents of hydroxide to mole equivalents of phenolic OH is between 0.1:1 and 0.95:1. More preferably, the ratio of mole equivalents of inorganic hydroxide to mole equivalents of phenolic OH is between 0.25:1 and 0.85:1. Most preferably, the ratio of mole equivalents of inorganic hydroxide to mole equivalents of phenolic OH is between 0.5:1 and 0.75:1. The inorganic hydroxide may be a solid or an aqueous solution. Preferably, the inorganic hydroxide comprises a 5-50 wt. % solution in water. More preferably, the inorganic hydroxide comprises a 10-25 wt. % solution in water. In some embodiments, the strength of the aqueous solution is preferably chosen such that the byproduct inorganic halide does not precipitate during the reaction. In some embodiments, the aqueous inorganic hydroxide solution may contain an inorganic salt to increase the density and ionic strength of the solution.

The reaction may be conducted in the presence of a cosolvent. Generally, any solvent which contains an alcohol functionality can be used. Examples of suitable aliphatic alcohols include, but are not limited to, methanol, ethanol, n-propanol, 2-propanol, n-butanol, 2-butanol, t-butanol, 2-methyl-2-butanol, 1-pentanol, 2-pentanol, 3-pentanol, 2-methyl-1-pentanol, 2-methyl-2-pentanol, and 4-methyl-2-pentanol. Examples of suitable alcohol with ether functionalities are 1-methoxy-2-ethanol, 1-ethoxy-2-ethanol, 1-butoxy-2-ethanol, 1-methoxy-2-propanol, 1-ethoxy-2-propanol, 1-isobutoxy-2-propanol, 1-phenoxy-2-propanol, 1-methoxy-2-butanol, 3-methoxy-1-butanol, 3-methoxy-3-methylbutanol, ethylene glycol monoisopropyl ether, ethylene glycol monoisobutyl ether, ethylene glycol mono-n-butyl ether, and ethylene glycol mono-tert-butyl ether.

Alcohols with secondary or tertiary alcohol functionalities are preferred to limit reactivity with the epihalohydrin. In an embodiment, examples of alcohols used are isopropanol and 1-methoxy-2-propanol. The amount by weight of the reaction cosolvent used is preferably from 0.2 to 10 times the weight of the epihalohydrin used, more preferably from 0.5 to 5 times the weight of the epihalohydrin used.

The etherification reaction may also be conducted in the presence of an organic dilution solvent. The dilution solvent may be any solvent which increases solubility of the epoxy resin in the organic phase. The dilution solvent, when used, preferably contains no functionalities that react easily with the polyhydric phenol, the epihalohydrin, the alkali metal or alkali earth metal hydroxide, or water. The dilution solvent preferably has limited solubility in water to facilitate brine separation and water washing. Examples of suitable dilution solvents include aromatic hydrocarbons, halogenated hydrocarbons, ketones and ethers. Especially suitable dilution solvents include, but are not limited to, toluene, xylenes, methyl ethyl ketone and methyl isobutyl ketone. Mixtures of one or more of these solvents may also be used. The amount by weight of the dilution solvent used is preferably from 0.2 to 10 times the weight of the epihalohydrin used, more preferably from 0.5 to 5 times the weight of the epihalohydrin used.

Bishalohydrin Ether Product

The crude reaction product of the etherification reaction comprises the bishalohydrin ether reaction product of the polyhydric phenol and the epihalohydrin, where a substantial majority of the phenolic OH groups have been etherified with the epihalohydrin. Preferably, 50% or more of the phenolic OH groups have been etherified. More preferably, 80% or more of the phenolic OH groups have been etherified. Most preferably, 95% or more of the phenolic OH groups have been etherified. The etherified phenolic OH groups will comprise both halohydrin ether and glycidyl ether end groups. The bishalohydrin ether is typically dilute in an organic feed solution which comprises the excess halohydrin, the optional cosolvent and/or the optional dilution solvent. All or part of the excess halohydrin, the optional cosolvent, the optional dilution solvent and/or the etherification catalyst may be removed from this mixture before step b). The crude reaction product of the etherification reaction may also comprise an aqueous phase containing the inorganic hydroxide. The aqueous phase may also comprise an inorganic halide which may be a byproduct of the etherification reaction when inorganic hydroxides are used as the etherification catalyst. All or part of the aqueous phase may be separated from the organic feed solution containing the bishalohydrin ether before step b). Preferably, the majority of the aqueous phase is separated from the organic solution before step b).

In an embodiment, step (b) comprises contacting the organic feed and an aqueous feed comprising a hydroxide with a high shear mixer to produce a first mixed feed.

In an embodiment, the hydroxide is an inorganic hydroxide. Preferably the inorganic hydroxide is an alkali metal hydroxide or an alkaline earth hydroxide. Examples include, but are not limited to sodium hydroxide, potassium hydroxide, and calcium hydroxide. In an embodiment, sodium hydroxide is used. If an inorganic hydroxide is used as the etherification catalyst in step a), the inorganic hydroxide of step b) is preferably the same as used in step a). Preferably, the hydroxide comprises an aqueous composition that is adjusted to prevent precipitation of the byproduct inorganic halide during the reaction. Preferably, a 5-50 wt. % solution of inorganic hydroxide in water is used. More preferably, a 10-25 wt. % solution of inorganic hydroxide in water is used. The amount of inorganic hydroxide used in step b) must be sufficient to give a product epoxy resin with low hydrolyzable halide content. This typically requires the use of some excess hydroxide, and the aqueous inorganic halide byproduct will also contain some unreacted inorganic hydroxide. Preferably, the ratio of the mole equivalents of inorganic hydroxide used in step b) to the mole equivalents of phenolic OH used in step a) is adjusted to give a product epoxy resin with a low hydrolysable chloride content and an aqueous inorganic halide byproduct stream with a low inorganic hydroxide content. Preferably, the ratio of the total amount of mole equivalents of hydroxide used in steps a) and b) to the mole equivalents of phenolic OH used in step a) is between 0.9:1 and 1.8:1. More preferably, the ratio of total mole equivalents of inorganic hydroxide used in steps a) and b) to mole equivalents of phenolic OH used in step b) is between 0.95:1 and 1.4:1. Most preferably, the ratio of total mole equivalents of inorganic hydroxide used in steps a) and b) to mole equivalents of phenolic OH used in step a) is between 0.98:1 and 1.25:1.

As in step a), a reaction cosolvent can be used. This cosolvent is described above in the description of step a). Alcohols with secondary or tertiary alcohol functionalities are preferred to limit reactivity with the epoxy resin product of step b). The reaction cosolvent preferably has either a high enough volatility to facilitate separation from the epoxy resin during solvent evaporation or a high enough partitioning coefficient to facilitate extraction from the mixture containing the epoxy resin reaction product and optional dilution solvent during wash. If the reaction cosolvent is to be removed from the epoxy resin by evaporation, the boiling point at atmospheric pressures is preferably less than 200° C., more preferably less than 150° C. The reaction cosolvent also preferably has high enough volatility to facilitate removal from brine or water by evaporation, distillation, or stripping. More preferably the reaction cosolvent forms an azeotrope with water that boils at a temperature below the boiling point of water. The amount by weight of the reaction cosolvent used is preferably from 0.2 to 10 times the weight of the epihalohydrin used, more preferably from 0.5 to 5 times the weight of the epihalohydrin used.

As in step a), a dilution solvent can be used. This dilution solvent is described above in the description of step a). The dilution solvent may be any solvent which increases solubility of the epoxy resin in the organic phase. The dilution solvent, when used, preferably contains no functionalities that react easily with the polyhydric phenol, the epihalohydrin, the alkali metal or alkali earth metal hydroxide, or water. The dilution solvent preferably has limited solubility in water to facilitate brine separation and water washing. The amount by weight of the dilution solvent used is preferably from 0.2 to 10 times the weight of the epihalohydrin used, more preferably from 0.5 to 5 times the weight of the epihalohydrin used.

A phase transfer catalyst may optionally be used in step b). Any known phase transfer catalyst that facilitates the two-phase reaction between the inorganic hydroxide and the bishalohydrin ether may be used. Examples of known phase transfer catalysts include quaternary ammonium halide catalysts such as benzyl trimethyl ammonium chloride, benzyl triethyl ammonium chloride, tetraethyl ammonium chloride, tetramethyl ammonium chloride, tetraethanol ammonium chloride and the like. Other useful phase transfer catalysts include quaternary ammonium hydroxides, quaternary phosphonium compounds, sulfonium compounds and the like. Suitable quaternary phosphonium compounds include ethyl triphenyl phosphonium iodide, ethyl triphenyl phosphonium bicarbonate, benzyl triphenyl phosphonium chloride, tetrabutyl phosphonium chloride and the like. Suitable sulfonium compounds include thiourea catalysts such as tetramethyl thiourea, N,N'-diphenyl thiourea and the like. The phase transfer catalyst may be the same as the etherification catalyst.

Reaction conditions of the dehydrohalogenation reaction may include a reaction temperature of from about 0° C. to about 100° C., and more preferably from about 20° C. to about 80° C.

High Shear Mixer

The aqueous and organic feeds are contacted with a high shear mixer. The high-shear mixer may be a mechanical high-shear mixer or a high-shear mixer with no moving parts. Examples of mechanical high-shear mixers include rotor-stator mixers, mechanical in-line mixers, colloid mills, homogenizers and Couette-flow mixers. Examples of rotor-stator mixers include those made by IKA, Silverson, Greerco, Ross and Oakes. An example of the mechanical in-line mixer is the Line Blender mixer produced by the Lightnin Corporation. Examples of high-shear mixers with no moving parts include high-shear tee mixers, jet mixers, impingement jet mixers, hydrosonic wedge mixers, valve homogenizers and ultrasonic mixers. An example of a hydrosonic wedge mixer, sometimes known as a liquid whistle, is the Sonolator mixer produced by the Sonolator Corporation.

The agitation rates should generally be high enough to produce an emulsion. Generally the mechanical high shear mixers used have the fluids pass through a small gap between the stationary stator and a rotor that spins at high revolutions per minute (RPM) breaking the fluids into small droplets. The main parameters of mechanical high shear mixers are the agitation speed (RPM), the clearance between rotor and stator and the shear rate experienced by the fluid.

The mixed feed exiting the high shear mixer is generally an emulsion. Emulsion is a mixture of two or more immiscible fluids where one fluid is dispersed as droplets in a second fluid which is the continuous phase. The drop size distribution and the average drop size is the key parameter in emulsions. Depending on the internal configuration of the shear mixer and the operating conditions, the drop size distribution can range from 0.1 micron to 100 microns. The ability of a mixer to obtain small droplet sizes in a mixture of two liquid phases is a function of the power input per unit mass, as described in Davies, J. T., *Chem. Eng. Sci.*, 42(7), 1671-1676, 1987. Typically, the power input per unit volume in agitated vessels is no more than $10^4$ W/kg, and small drop sizes cannot be achieved. In an embodiment of this invention, the power input per unit volume is preferably more than $10^4$ W/kg.

Phase Separator

In an embodiment, the mixed feed is then contacted with a phase separator. In an embodiment, the phase separator is a centrifugal separator. The centrifugal separator may be any centrifugal device operating with an internal acceleration field in excess of 1 g that is suitable for the separation of two liquid phases. Examples of suitable centrifugal separators include stacked-disk centrifuges (such as those produced by Westfalia, Alfa-Laval and Servizi Industriali), two-phase overflow centrifugal separators (such as those produced by the CINC corporation and Rousselet-Robatel), contacting centrifuges (such as the Podbielniak centrifuge produced by the B&P Equipments corporation, differential extractors produced by Hitachi and multistage centrifugal extractors made by Rousselet-Robatel), solid-bowl centrifuges (such as those made by Westfalia, Alfa-Laval, Bird Centrifuge or Sharples), super centrifuges (such as those made by Sharples), decanter centrifuges, tubular centrifuges or hydroclones. The key parameters of a phase separator are the rotational speed, expressed as multiples of gravity field and mechanical internals that permit separation of the dense and light fluids.

The phase separator separates a first organic product from the first aqueous product. The first organic product generally comprises an epoxy resin.

Optional Steps

After the first mixed feed is formed in step b), a reactor section may be used to provide additional residence time for reaction before the phases are separated. This reactor section may be a tubular reactor, a mixed tank or any other type of reactor that provides additional residence time for the two-phase liquid mixture. If the reactor section is a tubular reactor, it may contain internal elements intended to promote mixing, such as static mixing elements.

After the first mixed feed is formed in step b), heat exchangers may be used to remove or add heat from the reacting mixture before the phases are separated.

After the first mixed feed is formed in step b), the first mixed feed may again be passed through a high-speed mixer before being separated in step c).

In step d), the first organic product can then be recovered.

Steps b), c), and d) may be repeated one or more times.

For example, in an embodiment, step e) the first organic product and an aqueous feed comprising a hydroxide are contacted with a high shear mixer to produce a second mixed feed. Subsequently, in step f) the second mixed feed is contacted with a phase separator to form a second organic product comprising an epoxy resin and a second aqueous product; and in step g), the second organic product is then recovered.

When the steps are repeated, the organic product is again contacted with an aqueous feed comprising a hydroxide in a high-speed mixer and separated in a phase separator. The aqueous feed is generally of the same makeup as the aqueous feed described above. The high shear mixer and conditions therein are generally the same as described above. The second mixed feed is then contacted with a phase separator. The phase separator and conditions therein are generally the same as described above. If steps b) and c) are repeated, the aqueous product from one stage may be used as the aqueous feed to another stage. Preferably, the aqueous and organic feeds to each stage are arranged in a countercurrent fashion.

The crude reaction product of step c) (and step c)'s equivalents) comprising the epoxy resin may be subjected to additional processing to yield a purified epoxy resin, including post-treatment reactions, extraction and/or other purification steps. The crude product may be washed with water one or more times to remove ionic and/or water soluble components.

The washed solution containing the crude reaction product may be distilled to remove volatile components such as excess epihalohydrin and/or reaction solvents to yield the purified epoxy resin.

End Uses

Epoxy resins are used in the manufacture of coatings, castings, composites, tooling, flooring and adhesives. For more information on the uses of epoxy resins, see Pham, H. Q., Marks, M. J., "Epoxy Resins", in Kirk-Othmer Encyclopedia of Chemical Technology, vol. 10, John Wiley and Sons, 2004.

EXAMPLES

The following examples are intended to be illustrative of the present invention and to teach one of ordinary skill in the art to make and use the invention. This example is not intended to limit the invention in any way.

Various terms and designations used in the following examples are explained herein below:

All parts and percentages are based upon weight, unless otherwise stated. "ppm" refers to parts per million. All temperatures are in ° C. Unless otherwise stated herein, "room temperature" and "ambient temperature" are nominally 25° C.

The following standard analytical equipments and methods are used in the Examples:

Phenolic hydroxyl content is measured by quantitative ultraviolet absorption analysis based on the well known bathochromic shift of the long wavelength maximum of phenols under alkaline conditions (see, for example, Wexler, A. S., Analytical Chemistry, 35 (12), 1936-1943, 1963).

Viscosity is measured using calibrated Cannon-Fenske tubes in a constant-temperature bath.

Epoxy equivalent weight, hydrolyzable chloride content and ionic chloride content are measured by well-known titration techniques for epoxy resins.

The content of volatile organic substances in the aqueous and organic mixtures is measured by gas chromatography (GC) using a flame ionization detector (FID).

The water content of an organic solution is measured by Karl-Fischer titration.

The epoxy resin species in an organic solution may be analyzed by high-performance liquid chromatography (HPLC) with a diode-array ultraviolet light detector (DAD); hydrolyzable chloride content in the resin may be estimated from the HPLC results.

Total organic carbon (TOC) is analyzed using a TOC analyzer, such as those made by Shimadzu.

The benzyltrimethylammonium chloride content in a mixture is analyzed using high-performance liquid chromatography (HPLC) with a diode-array ultraviolet light detector (DAD).

Example 1

Preparation of Bishalohydrin Ether of Bisphenol A 22.5% bisphenol A (95% p,p'-bisphenol A purity), 77.3% epichlorohydrin and 0.22% benzyltrimethylammonium chloride (BTMAC) were mixed and held at temperatures between 45° C. and 60° C. for approximately three days. The mixture was analyzed by gas chromatography and found to contain approximately 50% epichlorohydrin and 15% 1,3-dichloro-2-propanol. The bishalohydrin ether of bisphenol A contained in the mixture was analyzed by HPLC and UV and found to consist of a mixture of oligomers comprising chlorohydrin and glycidyl ether end groups, and to have low residual phenolic OH content. This mixture was stored in a refrigerator until used in dehydrohalogenation experiments.

Example 2

Dehydrohalogenation of Bishalohydrin Ether of Bisphenol A

The following apparatus was used for the dehydrohalogenation reactions: An IKA Works Dispax DRL 3/5/3 rotor stator mixer equipped with three-stage coarse-medium-fine rotors and stators was used as the high shear mixer. The internal volume of the mixer was 350 ml. The mixer was driven by an electric motor through a gear box, and the mixer speed was controlled with a variable-frequency drive. The mixer was connected to insulated ¼" diameter 316SS tubing, which could be adjusted by valves to 18-36 feet in length, and which served as additional volume for the reaction. The tubing was connected to a Podbielniak model A-25 centrifugal separator, equipped with a 316SS rotor containing 15 elements containing 4-6 holes with a diameter of 3/32 inches. The light and heavy phase outlet ports of the centrifugal separator were connected to collection vessels.

200 ml/min of the bishalohydrin ether of bisphenol A mixture prepared in Example 1 and 100 ml/min of an aqueous solution containing 17.8% sodium hydroxide and 6.7% sodium carbonate were fed to the high-shear rotor-stator mixer operating at 4000 rpm. The temperature of the feed mixture was 59° C., and rose to 67° C. in the mixer. The mixed feed exited the mixer and entered the insulated 36 foot section of ¼" tubing. The average residence time in the mixer and tubing was 86 seconds. The reacted mixture entered the Podbielniak separator, which was operated at 6600 rpm, where it was separated into aqueous and organic phases. The organic product was analyzed by gas chromatography and HPLC, and all of the 1,3-dichloro-2-propanol and 83% of the epoxy resin chlorohydrin end groups were found to be converted to epichlorohydrin and glycidyl ether end groups, respectively. The hydrolyzable chloride content of the epoxy resin in the mixture was estimated from the HPLC analysis results to be approximately 9950 ppm. The BTMAC content of the organic stream was analyzed to be 970 ppm. The product aqueous phase was analyzed and found to contain 4 wt % sodium hydroxide, 3000 ppm BTMAC and 8000 ppm total organic carbon (TOC).

The organic product mixture from the centrifugal separator was collected and again fed to the dehydrohalogenation apparatus. 200 ml/min of the partially dehydrohalogenated organic product and 100 ml/min of an aqueous solution containing 17.8% sodium hydroxide and 6.7% sodium carbonate were fed to the high-shear rotor-stator mixer operating at 5000 rpm. The temperature of the feed mixture was 28° C., and rose to 47° C. in the mixer. The mixed feed exited the mixer and entered the insulated 36 foot section of ¼" tubing, and was then separated in the Podbielniak centrifugal separator. The organic product from the second pass was analyzed and 98% of the remaining epoxy resin chlorohydrin end groups were found to be converted to glycidyl ether end groups. The hydrolyzable chloride content of the epoxy resin in the mixture was estimated from the HPLC analysis results to be approximately 130 ppm. The product aqueous phase was analyzed and found to contain 15.5 wt % sodium hydroxide and 680 ppm BTMAC.

From the analysis results, the yield loss of epichlorohydrin was estimated to be 4% and 2%, respectively, for the first and second passes through the dehydrohalogenation apparatus, where yield loss is expressed as the amount of epichlorohydrin lost to side reactions divided by the amount of epichlorohydrin that reacted with the bisphenol A to form the epoxy resin.

Example 3

Preparation of Bishalohydrin Ether of Bisphenol A 34.2 lbs of bisphenol A (95% p,p'-bisphenol A purity), 97.0 lbs epichlorohydrin, 38.8 lbs isopropanol and 12.8 lbs deionized water were combined in a jacketed stainless steel reactor equipped with an agitator, and mixed until the bisphenol A was dissolved. The contents of the reactor were brought to 40° C. 35.4 lbs of 22% NaOH (1.3 mol NaOH/mol bisphenol A) was added continuously over 5 hours with agitation, while maintaining the temperature of the reaction at 40° C. After the caustic addition was completed, the reaction mixture was maintained at 40° C. with agitation for one hour to allow the caustic to fully react. The reactor contents were cooled to 20° C., the agitator was then stopped, and the two-phase mixture was allowed to stand for 30 minutes to allow the two liquid phases to separate. 53.0 lbs of aqueous brine was drained from the reactor. 8.8 lbs of deionized water was added to the reactor, and the contents were mixed. The agitator was stopped, and the two phase mixture was allowed to stand for 30 minutes to allow the two liquid phases to separate. 170.6 lbs of organic phase containing the coupled chlorohydrins intermediate mixture and 4.5 lbs of water were drained from the reactor. The organic phase was analyzed by gas chromatography and Karl-Fischer titration and was found to contain 20.8% isopropanol, 40.3% epichlorohydrin, 0.5% 1,3-dichloro-2-propanol, 0.1% glycidol and 6.0% water, with the balance being the coupled chlorohydrins intermediate. Analysis by UV spectroscopy found a phenolic OH content of 795 ppm. Isopropanol was added to the organic phase mixture to bring the isopropanol content to 27.8 wt %.

Example 4

Dehydrohalogenation of Bishalohydrin Ether of Bisphenol A

The apparatus described in example 2 was used for this example, except that the high-shear mixer was replaced with an IKA Magic Lab rotor-stator mixer equipped with three-stage fine-fine-fine rotors and stators, the insulating tubing consisted of 37 feet of insulated ⅜ inch diameter 316 stainless steel tubing, and a small 316SS heat exchanger was placed between the insulated tubing section and the Podbielniak centrifugal separator. The mixer had an internal volume of 45 ml. The tubing section had an internal volume of 440 ml. The heat exchanger was an ITT Standard model SSCF 02008, and was cooled on the shell side by a glycol/water mixture from a recirculating heating/cooling bath.

400 ml/min of the bishalohydrin ether of bisphenol A mixture prepared in Example 3 and 60 ml/min of an aqueous solution containing 22% sodium hydroxide were fed to the high-shear rotor-stator mixer operating at 20,000 rpm. The temperature of the combined two-phase feed mixture was 48° C., and rose to 70° C. in the mixer. The mixed feed exited the mixer and entered the insulated 37 foot section of ⅜ inch tubing, and was then cooled to 40° C. in the heat exchanger before entering the Podbielniak centrifugal separator, which was operating at 6600 rpm. The residence time in the mixer, insulated tubing and heat exchanger was 86 seconds.

The organic product was analyzed by gas chromatography and HPLC, and all of the 1,3-dichloro-2-propanol and 97% of the epoxy resin chlorohydrin end groups were found to be converted to epichlorohydrin and glycidyl ether end groups, respectively. The hydrolyzable chloride content of the epoxy resin in the mixture was estimated from the HPLC analysis results to be approximately 1200 ppm. The product aqueous phase was analyzed and found to contain 9 wt % sodium hydroxide, 2 wt % isopropanol and 16,300 ppm total organic carbon (TOC).

The organic product mixture from the centrifugal separator was collected and again fed to the dehydrohalogenation apparatus. 400 ml/min of the partially dehydrohalogenated mixture and 60 ml/min of an aqueous solution containing 20% sodium hydroxide were fed to the high-shear rotor-stator mixer operating at 20,000 rpm. The temperature of the combined two-phase feed mixture was 49° C., and rose to 72° C. in the mixer. The mixed feed exited the mixer and entered the insulated 37 foot section of ⅜ inch tubing, and was then cooled to 40° C. in the heat exchanger before entering the Podbielniak centrifugal separator, which was operating at 6600 rpm. The organic product was analyzed by gas chromatography and HPLC, and 85% of the remaining epoxy resin chlorohydrin end groups were found to be converted to glycidyl ether end groups. The hydrolyzable chloride content of the epoxy resin in the mixture was estimated from the HPLC analysis results to be approximately 180 ppm. The product aqueous phase was analyzed and found to contain 16.7 wt % sodium hydroxide, 1.3 wt % isopropanol and 14,000 ppm total organic carbon (TOC).

From the analysis results, the yield loss of epichlorohydrin was estimated to be 1.8% for the first pass of the organic mixture through the apparatus and 2.5% for the second pass, with yield loss expressed in the same manner as in Example 2.

Example 5

Yield Loss With Use of Centrifugal Separator

The apparatus described in Example 4 was used for these examples, except that the heat exchanger was removed and the centrifugal separator was replaced with a Westphalia Separator AT stacked disk centrifuge, model TA1-01-525.

320 ml/min of the bishalohydrin ether of bisphenol A mixture prepared in Example 1 and 160 ml/min of an aqueous solution containing 17.8% sodium hydroxide and 6.7% sodium carbonate were fed to the high-shear rotor-stator mixer operating at 10,000 rpm. The temperature of the feed mixture was 22° C., and rose to 30° C. in the mixer. The mixed feed exited the mixer and entered the insulated 37 foot section of 3/8 inch diameter tubing. The average residence time in the mixer and tubing was 65 seconds. The reacted mixture entered the centrifugal separator, which was operating at 9500 rpm, and was separated into two clear phases.

The aqueous phase was analyzed and found to contain 100 ppm BTMAC and 2100 ppm total organic carbon. From the analysis results, the yield loss of epichlorohydrin was estimated to be 1.7%, expressed as the amount of epichlorohydrin lost in the aqueous phase to side reactions divided by the amount of epichlorohydrin that reacted with the bisphenol A to form the epoxy resin in the organic phase.

Comparative Example 6

Yield Loss With Use of Gravity Decanting

Example 5 was repeated, except that the mixed two-phase reaction mixture was obtained from a sample valve between the insulated tubing section and the centrifugal separator. The two-phase reaction mixture was placed in a glass jar and the phases were allowed to separate. After 3 minutes from sample collection, the sample was still emulsified, but a poorly defined interface could be observed. Two clear phases with a distinct interface were not obtained until approximately 50 minutes after the samples were obtained. The aqueous phase was analyzed and found to contain 1620 ppm BTMAC and 4700 ppm total organic carbon. From the analysis results, the yield loss of epichlorohydrin was estimated to be 3.5%, expressed on the same basis as in Example 6. This example demonstrates that when high shear mixers are used, centrifugal separation is necessary for rapid phase separation and to reduce epichlorohydrin yield losses.

The invention claimed is:

1. A process comprising:
   a) contacting a polyhydric phenol and an epihalohydrin in the presence of a catalyst under reaction conditions to form an organic feed comprising a bishalohydrin ether;
   b) contacting said organic feed and an aqueous feed comprising an inorganic hydroxide with a high shear mixer to produce a first mixed feed comprising an emulsion;
   c) contacting said first mixed feed with a centrifugal separator to form a first organic product comprising an epoxy resin and a first aqueous product; and
   d) recovering said first organic product.

2. A process in accordance with claim 1 further comprising:
   e) contacting said first organic product and an aqueous feed comprising a hydroxide with a high shear mixer to produce a second mixed feed comprising an emulsion;
   f) contacting said second mixed feed with a centrifugal separator to form a second organic product comprising an epoxy resin and a second aqueous product; and
   g) recovering said second organic product.

3. A process in accordance with claim 1 wherein said first mixed feed is contacted with a reactor prior to said contacting with a centrifugal separator of step (c).

4. A process in accordance with claim 2 wherein said second mixed feed is contacted with a reactor prior to said contacting with a centrifugal separator of step (f).

5. A process in accordance with claim 1 wherein said phenol is selected from the group consisting of bisphenol-A, bisphenol-F, phenol-formaldehyde novolacs, cresol-formaldehyde novolacs, bisphenol-A-formaldehyde novolacs, trisphenols, biphenols, diphenols, hydroquinone and combinations thereof and said epihalohydrin is selected from the group consisting of epichlorohydrin, epibromohydrin, methylepichlorohydrin and combinations thereof.

6. A process in accordance with claim 1 wherein said catalyst of step a) is selected from the group consisting of sodium hydroxide, potassium hydroxide, calcium hydroxide, and combinations thereof.

7. A process in accordance with claim 1 wherein said inorganic hydroxide of step b) is selected from the group consisting of sodium hydroxide, potassium hydroxide, calcium hydroxide, and combinations thereof.

8. A process in accordance with claims 1 wherein steps a) and b) and are conducted in the presence of a cosolvent selected from the group consisting of isopropanol, 1-methoxy-2-propanol, and combinations thereof.

9. A process in accordance with claim 2 wherein step e) is conducted in the presence of a cosolvent selected from the group consisting of isopropanol, 1-methoxy-2-propanol, and combinations thereof.

10. A process in accordance with claim 1 wherein said reaction conditions in step a) comprise a first reaction temperature in the range of from 20° C. to 80° C.

11. A process in accordance with claim 1 wherein the molar ratio of said epihalohydrin to said phenol in step a) is in the range of about 1:1 to about 50:1.

* * * * *